US012794386B2

(12) United States Patent
Vandiver

(10) Patent No.: US 12,794,386 B2
(45) Date of Patent: Nov. 10, 2026

(54) SYSTEM AND TECHNIQUES FOR TRANSMISSION INTEGRAL GENERATOR/LINE INTERFACE UNIT MAGNETICS INTEGRATION

(71) Applicant: DRS Network & Imaging Systems, LLC, Melbourne, FL (US)

(72) Inventor: James C. Vandiver, Huntsville, AL (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

(21) Appl. No.: 19/053,168

(22) Filed: Feb. 13, 2025

(65) Prior Publication Data

US 2025/0219558 A1 Jul. 3, 2025

Related U.S. Application Data

(62) Division of application No. 17/989,375, filed on Nov. 17, 2022, now Pat. No. 12,255,571.

(60) Provisional application No. 63/280,981, filed on Nov. 18, 2021.

(51) Int. Cl.
*H02P 9/00* (2006.01)
*H02P 9/02* (2006.01)

(52) U.S. Cl.
CPC .................................... *H02P 9/02* (2013.01)

(58) Field of Classification Search
CPC .............. H02P 9/02; H02P 25/18; H02K 9/19
See application file for complete search history.

(56) References Cited

U.S. PATENT DOCUMENTS

| | | | | |
|---|---|---|---|---|
| 4,868,406 | A * | 9/1989 | Glennon | F02N 11/04 322/29 |
| 5,525,894 | A * | 6/1996 | Heller | H02P 9/48 322/29 |
| 6,476,509 | B1 * | 11/2002 | Chen | H02P 9/006 290/1 R |
| 10,697,416 | B2 | 6/2020 | Matsuyama et al. | |

(Continued)

OTHER PUBLICATIONS

U.S. Appl. No. 17/989,375 , Non-Final Office Action, Mailed On Jun. 10, 2024, 23 pages.

(Continued)

*Primary Examiner* — Julio C. Gonzalez
(74) *Attorney, Agent, or Firm* — Kilpatrick Townsend & Stockton LLP LLP

(57) ABSTRACT

A method of conditioning electrical power includes receiving an alternating current from an external power source via a port. The method also includes opening a plurality of contactors in a partial line interface switching unit to unlink a plurality of generator windings of a transmission integral generator, wherein the plurality of generator windings are connected to the port through the partial line interface switching unit. The method also includes conditioning the alternating current as the alternating current flows through the plurality of generator windings, wherein the plurality of generator windings produce an impedance, and actively rectifying the conditioned alternating current using a generator controller bus regulator coupled to the transmission integral generator to produce a direct current. The method also includes connecting the direct current to a power distribution unit.

13 Claims, 13 Drawing Sheets

(56) References Cited

U.S. PATENT DOCUMENTS

| | | | | |
|---|---|---|---|---|
| 12,255,571 | B2 | 3/2025 | Vandiver | |
| 2002/0190525 | A1* | 12/2002 | Worden | H02P 9/04 290/1 A |
| 2007/0227470 | A1* | 10/2007 | Cole | F02N 11/04 123/3 |
| 2011/0217615 | A1 | 9/2011 | Smith et al. | |
| 2012/0326516 | A1 | 12/2012 | Gurunathan et al. | |
| 2017/0141633 | A1* | 5/2017 | Atalla | H02P 25/22 |
| 2019/0326839 | A1* | 10/2019 | Gao | F02N 11/04 |

OTHER PUBLICATIONS

U.S. Appl. No. 17/989,375 , Notice of Allowance, Mailed On Nov. 15, 2024, 8 pages.

Application No. AEP6002423/2022 , Office Action, Mailed On Dec. 13, 2024, 10 pages.

* cited by examiner

SYSTEM AND TECHNIQUES FOR TRANSMISSION INTEGRAL GENERATOR/LINE INTERFACE UNIT MAGNETICS INTEGRATION

CROSS REFERENCE TO RELATED APPLICATIONS

This application is a divisional of U.S. patent application Ser. No. 17/989,375 filed Nov. 17, 2022, entitled "SYSTEM AND TECHNIQUES FOR TRANSMISSION INTEGRAL GENERATOR/LINE INTERFACE UNIT MAGNETICS INTEGRATION," which is a non-provisional of and claims the benefit of and priority to U.S. Provisional Patent Application No. 63/280,981 filed on Nov. 18, 2021, the contents of which are incorporated by reference in their entirety for all purposes.

BACKGROUND OF THE DISCLOSURE

Modern vehicular power systems have an ever increasing demand for power generation and power conditioning. Power generation and conditioning systems incorporated into vehicles can occupy much needed and limited space in the vehicle and the weight of these components add to the total weight and can reduce the overall efficiency of the vehicle. Current designs may not be capable of meeting the requested power requirements.

Despite the progress made in the area of power generation, there is a need for improved methods and systems related to power generation.

SUMMARY OF THE DISCLOSURE

In an aspect, a transmission integral generator can be modified to both generate power with the generator's multiple windings and condition incoming or outgoing electrical power. In addition, the power system can reduce weight and increase available space by removing one or more redundant components. For example, redundant components (e.g., isolation transformers, line interface units, and machine controllers) can be removed from the system allowing for a significant decrease in weight and increase in available space. In various embodiments, the line interface unit can be modified to allow for switching between power generation by the transmission integral generator and conditioning of external power using the windings of the transmission integral generator. Switching can be accomplished by connectors, by bus bars, by electromechanical switches, or via a manual switch. This multi-mode configuration can also free more power distribution unit ports for use (e.g., a micro grid, inverters, direct current to direct current (DC-DC) converters, etc.).

In some aspects, a system to generate and control electrical power includes an engine; a transmission integral generator mechanically coupled to the engine, wherein the transmission integral generator is configured to generate an electrical current; a plurality of contactors to connect one or more windings of the transmission integral generator; a generator controller bus regulator coupled to the transmission integral generator and configured to provide active rectification of the electrical current for AC power import or inversion of DC power for AC power export; a partial line interface switching unit coupled to the transmission integral generator to support either import, export or generation of electrical power, the partial line interface switching unit being configured to: operate at least one of the plurality of contactors to configure the windings of the transmission integral generator to produce power or operate the plurality of contactors to configure the windings of the transmission integral generator to perform as an inductor for conditioning of power for import or export; and a port coupled to the partial line interface switching unit for importing an external power source or exporting electrical power to an external load.

In some aspects, the electrical current is three-phase. In some aspects the electrical current is variable voltage. In some aspects, the electrical current is variable frequency.

In some aspects, an isolation transformer coupled to the partial line interface switching unit to isolate the system from a source of external power or external load.

In some aspects, the system includes a housing enclosing the transmission integral generator. In various aspects the electrical current comprises multiple phases. The transmission integral generator includes a winding for each phase of the multiple phases. Each winding can include a first end and a second end and the first end and the second end of each winding can be accessible outside the housing enclosing the transmission integral generator.

In some aspects, a damping network comprising a capacitor and a resistor in series connected to each phase of the transmission integral generator during either the import of electrical power or the export of electrical power.

In some aspects, the system further includes a power distribution unit coupled to the generator controller bus regulator.

In some aspects, the transmission integral generator is liquid-cooled.

In some aspects, a system operable to generate and control electrical power includes a vehicle engine mechanically coupled to a transmission integral generator, the transmission integral generator configured to generate an electrical current; a generator controller bus regulator coupled to the transmission integral generator for active rectification of the electrical current; a partial line interface switching unit coupled to the transmission integral generator to control either import or export of electrical power, the partial line interface switching unit including a connector, the connector inserted for the transmission integral generator to produce power and the connector removed when the transmission integral generator is used as an inductor for conditioning of external power; and a port for importing or exporting the electrical current.

In various aspects, the connector includes a removable plug. The connector can include a manual switch or electromechanical switches.

In various aspects, the system can include an isolation transformer coupled to the partial line interface switching unit to isolate the system from a source of external power.

In various aspects, the transmission integral generator includes a winding for each phase of current and both ends of the winding are accessible outside a housing enclosing the transmission integral generator.

In various aspects the system includes a damping network comprising a capacitor and a resistor in series connected to each phase of the transmission integral generator during either the import of electrical power or the export of electrical power.

In various embodiments, the system can include a power distribution unit coupled to the generator controller bus regulator.

In various embodiments, the transmission integral generator is liquid-cooled.

In an aspect, a method of conditioning electrical power includes receiving an alternating current from an external power source via a port. The method can include opening a plurality of contactors in a partial line switching unit to unlink a plurality of generator windings of a transmission integral generator. The generator windings connect to a partial line interface switching unit (line side) and to a generator controller bus regulator (GCBR) or machine controller. The method can include conditioning the alternating current as the alternating current flows through the plurality of generator windings. The plurality of generator windings can produce an impedance. The method can include connecting the conditioned alternating current to a power source.

In various aspects, the method can include a damping network comprising a resistor and capacitor in series connected to each phase line of a transmission integral generator during either the import of electrical power or the export of electrical power.

In various aspects, the method can include passing the alternating current through an isolation transformer between the port and the partial line switching unit.

In various aspects, the method can include switching the plurality of contactors in the partial line switching unit to link the plurality of generator windings of a transmission integral generator for power generation by the transmission integral generator.

In various aspects, the plurality of windings of the transmission integral generator are connected in a wye configuration.

In various aspects, the method can include rectifying the conditioned alternating current using a generator controller bus regulator coupled to the transmission integral generator.

In an aspect, a method of conditioning electrical power can include receiving a direct current from an external power source via a power distribution unit. The method can include inverting the direct current to produce alternating current by means of a generator controller bus regulator. The method can include opening a plurality of contactors in a partial line interface switching unit to unlink a plurality of generator windings of a transmission integral generator. The plurality of generator windings can be connected to a port through the partial line interface switching unit. The method can include conditioning the alternating current as the alternating current flows through the plurality of generator windings. The plurality of generator windings can produce an impedance forming part of a low-pass filter. The method can include connecting the conditioned alternating current to an external load.

In various aspects, the method can include importing or exporting electric power via a damping network comprising a resistor and capacitor in series connected to each phase line of a transmission integral generator.

In various aspects, the method can include passing the alternating current through an isolation transformer between the partial line switching unit and the port.

Numerous benefits are achieved by way of the present disclosure over conventional techniques. For example, embodiments of the present disclosure can provide methods and systems for providing electrical power or for conditioning power for import or export. These and other embodiments of the disclosure, along with many of its advantages and features, are described in more detail in conjunction with the text below and corresponding figures.

BRIEF DESCRIPTION OF THE DRAWINGS

Like reference symbols in the various drawings indicate like elements, in accordance with certain example implementations. In addition, multiple instances of an element may be indicated by following a first number for the element with a letter or a hyphen and a second number.

DETAILED DESCRIPTION OF SPECIFIC EMBODIMENTS

According to some embodiments of the present disclosure, a transmission integral generator system can be modified to both generate power with the generator's multiple windings (when the generator is rotating) and to condition incoming or outgoing electrical power (when the generator is stationary). In addition, the power system can reduce weight and increase available space by removing one or more redundant components. For example, redundant components (e.g., isolation transformers, line interface units, and machine controllers) can be removed from the system, allowing for a significant decrease in weight and increase in available space. In various embodiments, the line interface unit can be modified to allow for switching between power generation by the transmission integral generator and conditioning of power using the windings of the transmission integral generator. Switching can be accomplished by connectors, bus bars, electromechanical switches, or via a manual switch. This multi-mode configuration can also free more power distribution unit ports for use (e.g., a micro grid, inverters, DC-DC converters, etc.).

Figure 1:
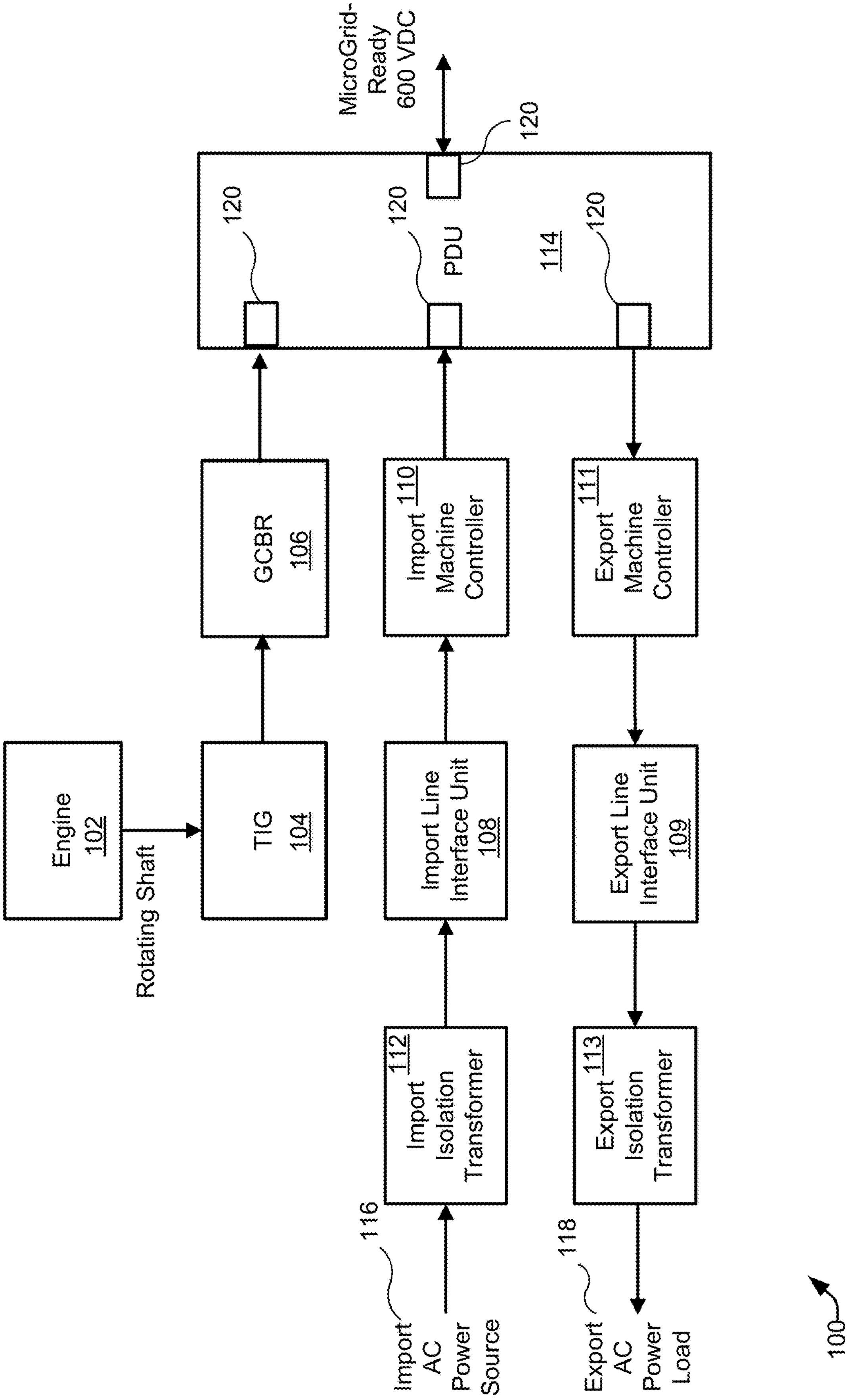
FIG. 1 illustrates an exemplary transmission integral generator system.

FIG. 1 illustrates a transmission integral generator system 100. The transmission integral generator system 100 can be part of an onboard vehicle power system. The transmission integral generator system 100 can generate electrical power for electrical distribution. The transmission integral generator system 100 can receive and condition power from an external source or condition power for application to an external load. Additionally, the transmission integral generator system 100 can send electrical power to an external distribution circuit. The transmission integral generator system 100 can include an engine 102. The engine 102 can include a rotating shaft that is coupled to or part of the transmission of the vehicle. The rotating shaft can be connected to a transmission integral generator (TIG) 104. In various embodiments, the TIG 104 can be a permanent magnet machine that generates electrical power as a plurality of magnets rotate within the stator windings. The permanent magnets provide the magnetic field which interacts with the stator windings to produce an EMF. While the engine 102 is running, the TIG 104 can output electrical power from one or more windings of the TIG 104. The output of the TIG 104 can be three-phase electrical power. The three-phase electrical power can be variable voltage and variable frequency dependent on the speed of the engine 102.

The electrical power from the TIG 104 can be routed to the GCBR 106. The GCBR 106 can include power switching electronics (e.g., insulated-gate bipolar transistors (IGBTs), one or more capacitors, and appropriate control electronics. The IGBT can be a three-terminal power semiconductor device primarily used as an electronic switch, which can combine high efficiency and fast switching.

The GCBR 106 can include metal-oxide-semiconductor field-effect transistor (MOSFET) switching devices. A MOSFET device a type of insulated-gate field-effect transistor that can be fabricated by the controlled oxidation of a semiconductor, typically silicon. The voltage of the covered gate determines the electrical conductivity of the device; this ability to change conductivity with the amount of applied voltage can be used for amplifying or switching electronic signals.

The GCBR 106 can actively rectify the power generated by the TIG 104 and generate a predetermined direct current (DC) voltage, which is sent to the power distribution unit (PDU) 114. In various embodiments, the GCBR 106 can output a pre-determined voltage (e.g., 600 volts DC). The GCBR 106 can provide droop control of the DC output to allow for paralleling multiple sources through the PDU 114 for MicroGrid operation. The pre-determined voltage can be caused to vary (e.g., droop) depending on the load. The PDU 114 can include a set of DC switches configured to distribute power from the TIG 104 or input power from other sources or loads.

FIG. 1 also illustrates the importation of power from an alternating current (AC) power source 116 via a connector. The connector allows the AC power source 116 to be connected to an import isolation transformer 112. The AC power source 116 can be line power from a building or other power distribution network. The isolation transformer 112 can be used to avoid disturbance of the grounding system of an existing AC service and to present a “floating” set of windings to the on-board vehicle power system-which mimics the “floating” windings of the TIG 104. The “floating” windings present a high impedance to ground, mainly through the small stray capacitance between the windings and the transformer case/chassis ground. This high impedance can block common-mode currents created by the machine controllers or GCBR 106 which would become large if the windings connected to the on-board vehicle power system included a ground connection.

Import isolation transformer 112 can block transmission of a DC component (such as might result from a fault in a machine controller) in waveforms from one circuit to the other, but allow AC components in signals to pass. Transformers that have a turns ratio of 1-to-1 between the primary and secondary windings are often used to protect secondary circuits and individuals from electrical shocks between energized conductors and earth ground. Other turns ratios can be used to transform the AC service voltage to the desired voltage for use with the machine controller (e.g., 480 VAC to 208 VAC).

The external AC power can be routed from the import isolation transformer 112 to an import line interface unit (LIU) 108. Import LIU 108 can include inductor-capacitor (LC) circuits. The LC circuits within the LIU provide the impedance to support active rectification and provide a low-pass filter function to prevent high-frequency switching currents from the machine controllers from entering the AC service.

For purposes of illustration, the LC circuits depicted herein are ideal and exclude stray resistances which can be inherent in a practical circuit.

The import LIU 108 can couple several large reactors with a cold plate for liquid cooling and a capacitor network. The liquid cooling can include multiple different liquids, e.g., 50/50 water/ethylene glycol (WEG) is typically used, but in some cases transformer oil might be used to cool a magnetic. The oil would in turn likely be cooled by a WEG loop with a heat exchanger. The import LIU 108 can be connected to an import machine controller 110. The import machine controller 110 is similar to the GCBR 106 and can include IGBTs and one or more capacitors, and appropriate control electronics. The import LIU 108, along with the import machine controller 110 can be used to actively rectify import power from an AC line with a fixed frequency. In various embodiments, the fixed frequency can be 50 to 60 Hz. For some military systems 400 Hz can be encountered. The TIG 104 can generate 400 Hz at 2000 rotations per minute (RPM). Therefore, 400 Hz is within the active rectification capability of the GCBR whether obtained from a TIG or an AC service. The frequencies stated herein are merely exemplary and the disclosure is not limited to the frequencies disclosed herein. The TIG 104 can produce electrical current at different frequencies depending on a given shaft speed. The import machine controller 110 can utilize the impedance of the line interface to support active rectification. The output of the import machine controller 110 can provide a predetermined direct current (e.g., 600 volts DC) for the DC bus. The import machine controller 110 can provide a DC output current to the PDU 114.

The transmission integral generator system 100 can also export AC electrical power, for example, AC power, to an external load 118. The PDU 114 can send electrical power to an export machine controller 111. The export machine controller 111 can convert the electrical power from direct current (e.g., 600 volts DC) to alternating current. The export machine controller 111 can deliver the electrical power to the export LIU 109. The export LIU 109 can act as a filter and smooth out the electrical waveforms from the export machine controller 111. In various embodiments, the export LIU 109 can generate three-phase alternating current at a predetermined frequency. In various embodiments, the predetermined frequency is 50-60 Hz. For some military systems 400 Hz can be encountered. The electrical power can be routed from the export LIU 109 to an export isolation transformer 113. The electrical power can be routed through the export isolation transformer 113 to an external power connector.

As can be seen in FIG. 1, the transmission integral generator system 100 can have several redundant components such as two LIUs (i.e., import LIU 108 and export LIU 109), two isolation transformers (i.e., import isolation transformer 112 and export isolation transformer 113), and two machine controllers (i.e., import machine controller 110 and export machine controller 111). Each of the LIUs can have large reactors or inductors. In addition, the LIUs can generate heat and can require liquid cooling. LIUs 108 and 109 can weigh approximately 120 pounds each (for exemplary 10 kilo Watt (KW) units) due to the need for large, liquid-cooled reactors and other components, including a cold plate to remove heat from those components. Higher power levels would require larger, heavier components. The LIUs can contribute to a large portion of the weight making up the transmission integral generator system 100.

The isolation transformers can also be large and heavy. For example, a modest (15 kVA) isolation transformer unit can weigh 130 pounds. A machine controller can be an off-the-shelf commercial unit that can weigh 84 pounds for a dual unit. The GCBR 106 can weigh 125 pounds. The transmission integral generator system 100 illustrated in FIG. 1 includes redundant hardware that increases the weight of the overall system in addition to taking up space. Accordingly, embodiments of the present disclosure provide systems and techniques that are useful in reducing the redundancy present in the transmission integral generator system 100.

The PDU 114 can include a plurality of Ports 120. The Ports 120 allow for connection of various components to the PDU 114. While FIG. 1 illustrates four ports, one skilled in the art would appreciate any number of Ports 120 being used. As illustrated in FIG. 1 the GCBR 106, the import machine controller 110, and the export machine controller 111 all can connect to the PDU 114 via one or more Ports 120.

In various embodiments, the transmission integral generator system 100 can operate the engine and generate alternating current electrical power using the TIG 104 and the GCBR 106 can convert the alternating current to a direct current (e.g., 600 volts DC). The direct current can be fed through the PDU 114 and connected to a variety of loads, such as an inverter (to produce alternating current, e.g., 208 VAC) or a DC-to-DC converter that provides various output voltages (e.g., 28 volts DC).

In other embodiments, the transmission integral generator system 100 can import AC power and condition or transform that imported AC power into a direct current that can be fed into an electrical distribution system. The imported AC power can be a local AC power line from a building or power generation facility. The AC power can be of varying voltages and varying frequencies.

The isolation transformer allows the transmission integral generator system to be connected to the AC service without disturbing the existing grounding connections of the service. This is important for safety and for compliance with electrical regulations/codes. The AC service ground connections cannot be disturbed because there would likely be other users of the service dependent upon those connections for safety. Thus, the "primary" windings of the isolation transformer can be connected according to local regulations/codes. Safety ground connections would be provided elsewhere in the transmission integral generator system- but not in the "secondary" windings of the isolation transformer.

The "secondary" windings of the isolation transformer that are directly utilized by the transmission integral generator system must be "floating"—that is, ungrounded, just as the windings of the transmission integral generator itself are floating. This effectively breaks the circuit for any common-mode high frequency currents produced by the machine controller, other than the small stray capacitance between the transformer windings and the grounded chassis of the transformer (this capacitance presents a high impedance to the common-mode current).

Without the isolation transformer, the common mode currents would circulate into the AC service and through the machine controller unless a large amount of common-mode filtering was added to the LIUs. This would require even more large magnetics and liquid cooling.

Figure 2A:
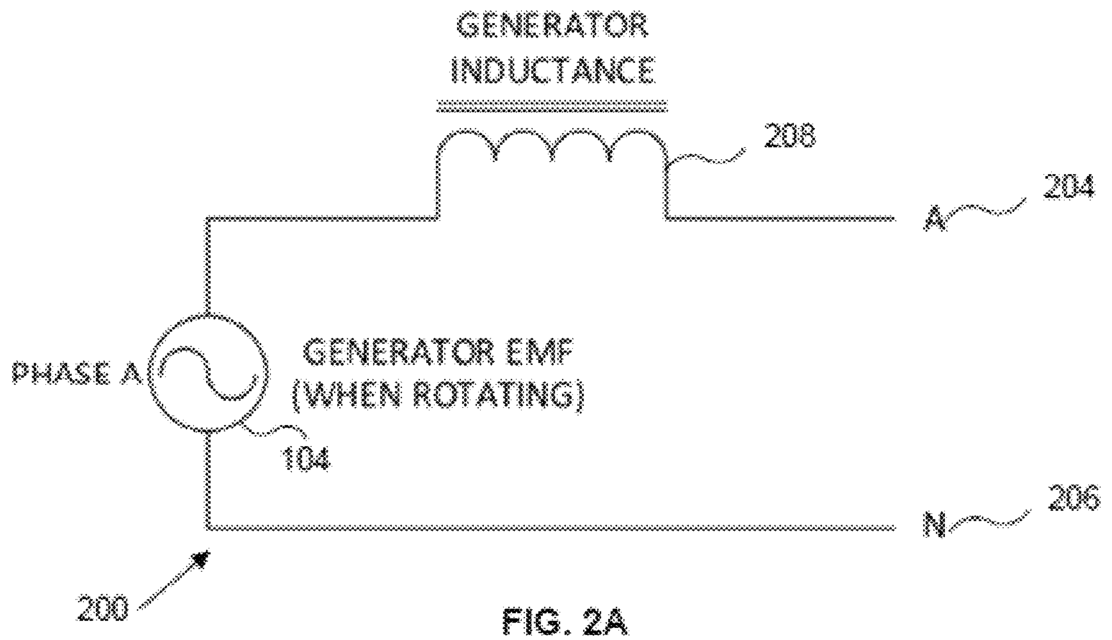
FIG. 2A illustrates a first exemplary single-phase generator model when the generator is running.

FIG. 2A illustrates a first exemplary single-phase generator model 200 when the generator is running. When the TIG 104 is rotating, it creates an electro-motive force (EMF) between line-A 204 and neutral 206 as the magnets sweep by the windings. The first exemplary single-phase generator model 200 can include inherent impedance 208. FIG. 2A illustrates only a single-phase for electrical power generation, one skilled in the art can understand that the TIG 104, as shown in FIG. 1, can include multiple phases (e.g., Phase A, Phase B, and Phase C).

Figure 2B:
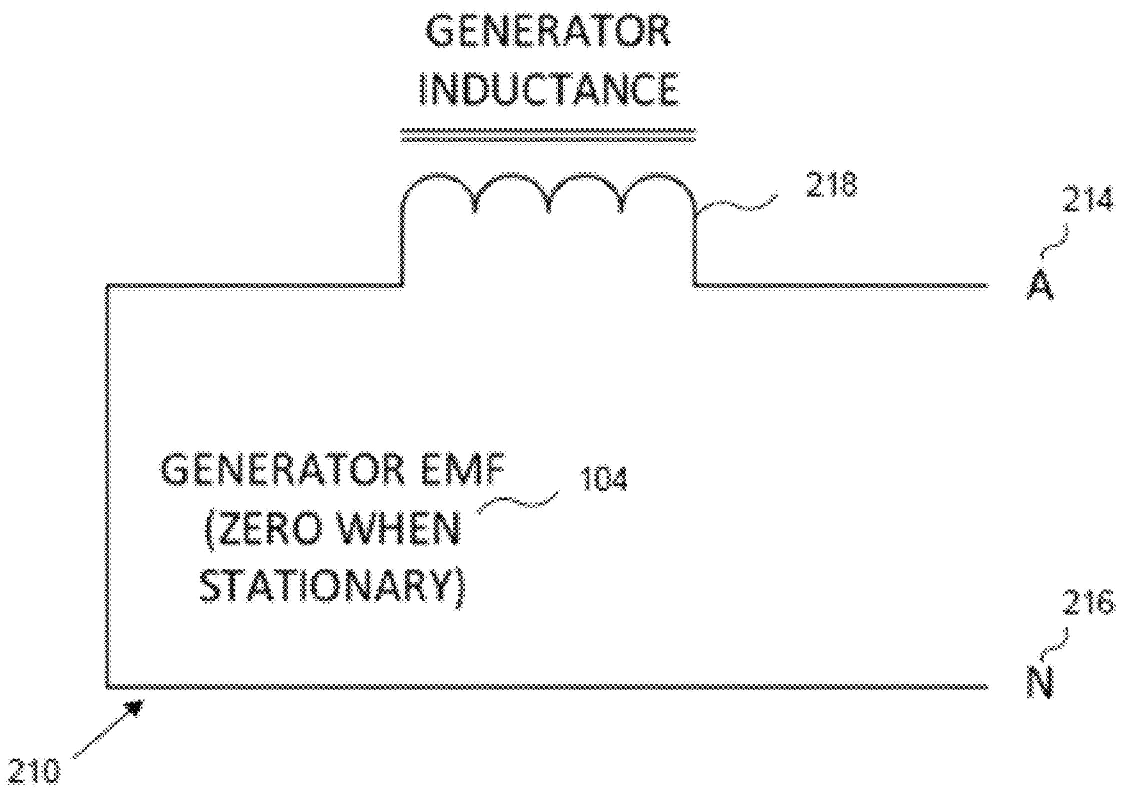
FIG. 2B illustrates a second exemplary single-phase generator model when the generator is not running.

FIG. 2B illustrates a second exemplary single-phase generator model 210 when the generator is not running. In a second exemplary single-phase generator model 210, if the TIG 104 is no longer rotating, no EMF is created. This leaves an inherent impedance 218 between line-A 214 and neutral 216. Therefore, the TIG 104 windings that provide the inherent impedance 218 can be used to condition external electrical power when the TIG 104 is not being used to generate electrical power. While FIG. 2B illustrates only a single-phase for electrical power generation, it will be appreciated by one skilled in the art that the TIG 104, as shown in FIG. 1, can generate electrical power in multiple phases (e.g., Phase A, Phase B, and Phase C).

Figure 3A:
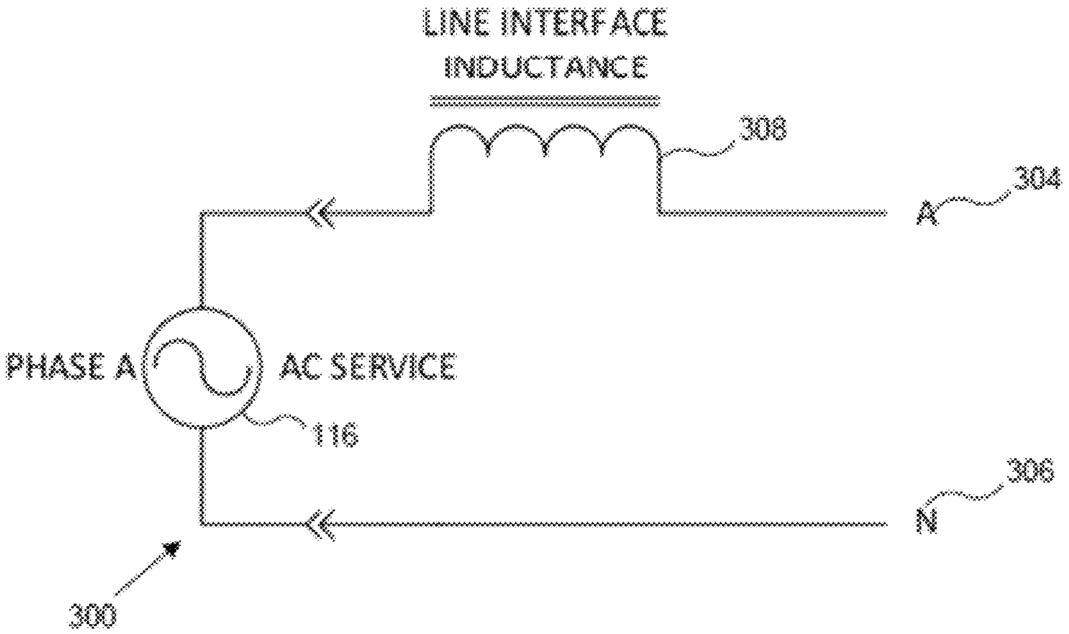
FIG. 3A illustrates a first exemplary model that uses a line interface unit to provide impedance for an external electrical power source.

FIG. 3A illustrates a first exemplary model 300 that uses the impedance of an LIU 308 to provide impedance for an external electrical power source. The LIU 308 can be the LIU 108 as shown in FIG. 1. While FIG. 3A illustrates only a single-phase (e.g., Phase A) for the electrical service, it will be appreciated by one skilled in the art that the AC power source 116, as shown in FIG. 1, can supply multiple phases (e.g., Phase A, Phase B, and Phase C) that can be conditioned by the LIU 308. As discussed for FIG. 1, the import LIU 108 can include an inductor to support active rectification of electrical power from an AC electrical power source 116 between line-A 304 and neutral 306 by import machine controller 110.

Figure 3B:
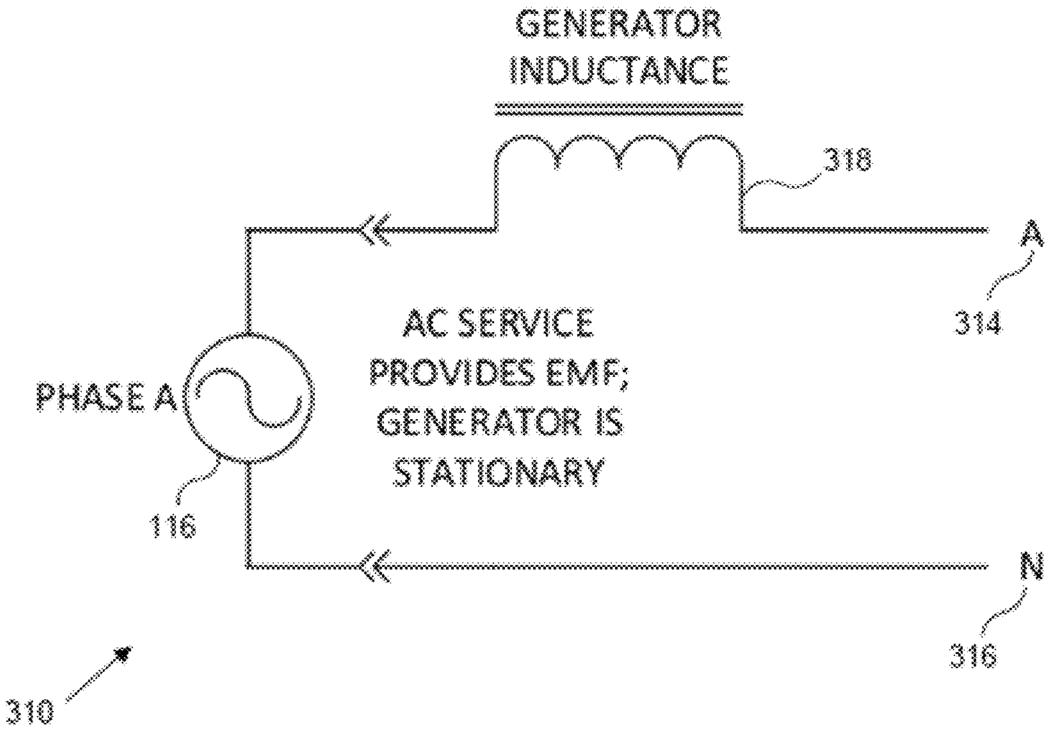
FIG. 3B illustrates a second exemplary model that uses generator windings to provide impedance for an external electrical power source.

FIG. 3B illustrates a second exemplary model 310 that uses generator windings from the TIG 104, as shown in FIG. 1, to provide impedance for an external electrical power source (e.g., import AC power source 116 as shown in FIG. 1). In the second exemplary model 310, the TIG 104 is not generating electrical power. While FIG. 3B illustrates only a single-phase (e.g., Phase A) for electrical power generation, it will be appreciated by one skilled in the art that the TIG 104, as shown in FIG. 1, can include multiple phases (e.g., Phase A, Phase B, and Phase C) that can drive the TIG 104 windings 318 between line-A 314 and neutral 316. By using the impedance of the TIG 104 windings 318, the large inductors on the machine-controller side of the LIU 108 as shown in FIG. 1 can be eliminated.

Using generators, such as TIG 104, to provide impedance can provide several advantages to include savings in system weight and space. The TIG 104 can already include a provision for cooling (e.g., liquid cooling) with the associated coolant loop. The TIG 104 can be scaled to a large power level. In various examples, a small TIG 104 can provide 30 kilowatts and a large TIG 104 can provide 120 kilowatts. Therefore, TIG 104 already has an inherent impedance that can be used for conditioning external power by modifying the wiring of the windings as discussed below.

Figure 4C:
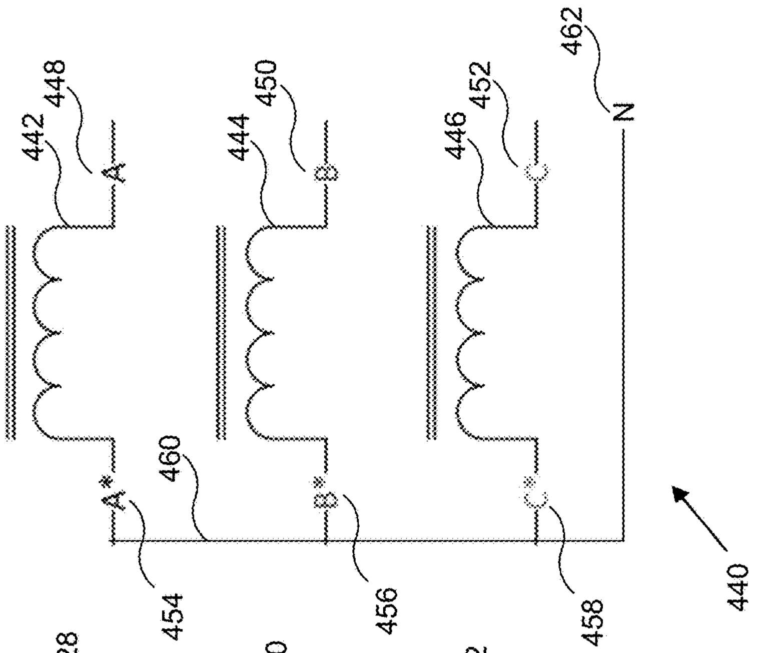
FIG. 4C illustrates an exemplary multi-mode transmission integral generator unit for generating electrical power.
Figure 4B:
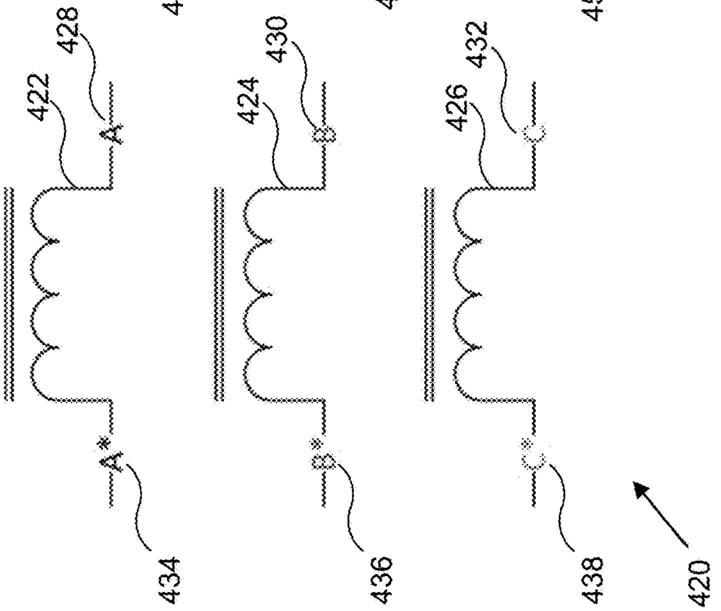
FIG. 4B illustrates an exemplary multi-mode transmission integral generator unit for conditioning external electrical power.
Figure 4A:
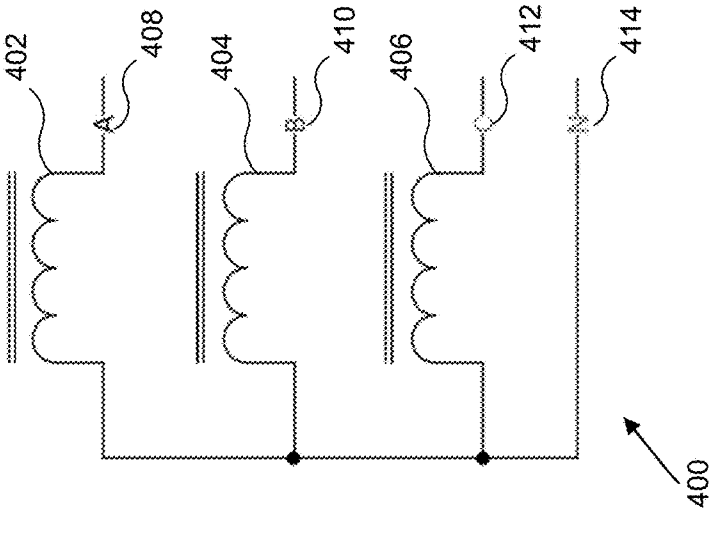
FIG. 4A illustrates an exemplary transmission integral generator unit.

FIG. 4A illustrates an exemplary TIG 104 as illustrated in FIG. 1. In a first wiring pattern 400, a TIG 104 can include three sets of windings (e.g., first windings 402, second windings 404, and third windings 406). These three sets of windings can provide three phases of AC electric power (e.g., Phase A, Phase B, and Phase C). The TIG 104 as shown in FIG. 4A can have one end of the winding accessible. For example, end-A 408, end-B 410, and end-C 412 can be connected to a power distribution bus. The TIG 104 can also include a neutral 414. In normal operations, the neutral 414 can tie together the three windings of the TIG 104 in a node. In various embodiments, the neutral 414 is not routinely brought out of a housing for the TIG 104.

FIG. 4B illustrates a second exemplary multi-mode transmission integral generator model 420 for conditioning an external electrical power source. In the second exemplary multi-mode transmission integral generator model 420, the TIG 104 can also include three sets of windings (e.g., first windings 422, second windings 424, and third windings 426). These three sets of windings can provide three phases of AC electric power (e.g., Phase A, Phase B, and Phase C). The TIG 104 as shown in FIG. 4B can make each end of the electrical connectors accessible. For example, end-A 428, end-B 430, and end-C 432 can be connected to a power distribution bus. For the second exemplary multi-mode transmission integral generator model 420, end-A* 434, end-B* 436, and end-C* 438 can be connected to an external source of alternating current. The windings of the TIG 104 can be connected to a partial line interface switching unit, and the partial line interface switching unit connected to an isolation transformer. A partial line interface switching unit can contain the "line side components" of blocks 108 or 109 of FIG. 1 plus the switching necessary to change the winding configuration between those given in 4B and 4C. In this way, the windings (e.g., first windings 422, second windings 424, and third windings 426) can provide the impedance to condition the alternating current received from the external source of alternating current.

FIG. 4C illustrates a third exemplary multi-mode transmission integral generator model 440 for generating electrical power by the TIG 104. In the third exemplary multi-mode transmission integral generator model 440, the TIG 104 can also include three sets of windings (e.g., first windings 442, second windings 444, and third windings 446). These three sets of windings can provide three phases of AC electric power (e.g., Phase A, Phase B, and Phase C). The TIG 104 as shown in FIG. 4C can make each end of the electrical connectors accessible. For example, end-A 448, end-B 450, and end-C 452 can be connected to a power distribution bus. For the third exemplary multi-mode transmission integral generator model 440, end-A* 454, end-B* 456, and end-C* 458 can be connected together for the generation of electrical power. In various embodiments the windings can be connected together using a removable connector 460. In other embodiments, the removable connector can include a removable plug, bus bars, electromechanical switches (e.g., contactors) or manually operated switches as mentioned above. The removable connector 460 can be inserted for the transmission integral generator to produce power. The removable connector 460 can be removed when the transmission integral generator is used as an inductor for conditioning of external power for import. The same configuration, the connector 460 removed, can be used for power export.

However, in the second wiring pattern 420, each end of the windings for each phase can be made accessible. For example, end-A* 434, end-B* 436, and end-C* 438 can be made accessible outside the generator. End-A* 434, end-B* 436, and end-C* 438 can be connected to form a neutral 462 for when the generator is in use and disconnected when the generator windings (e.g., first windings 422, second windings 424, and third windings 426) will be used to condition imported AC power. In other embodiments, the selective connections can also be made with connectors, switches, or electromechanical switches (relays or contactors).

Figure 5:
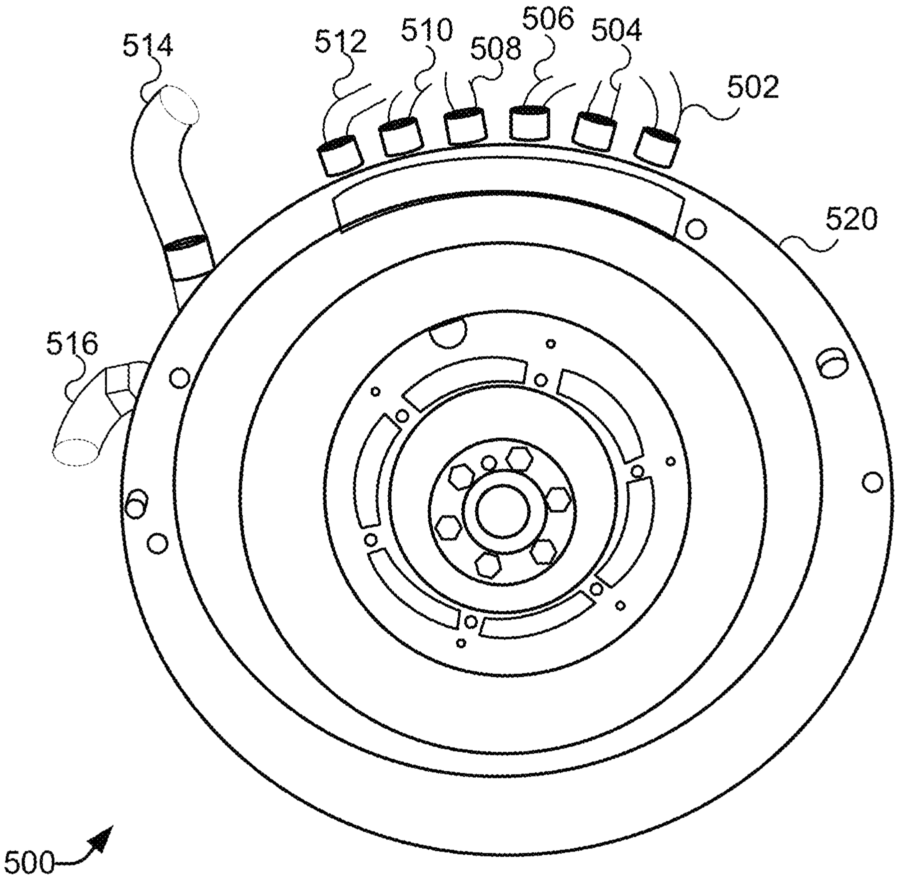
FIG. 5 illustrates a front view of an exemplary transmission integral generator system according to an embodiment of the present disclosure.

FIG. 5 illustrates a front view of a multi-mode transmission integral generator 500. The multi-mode transmission integral generator 500 can generate alternating electrical current in three phases (e.g., Phase A, Phase B, and Phase C). The housing can enclose the transmission integral generator. As illustrated in FIG. 5, each end of each of the windings can be accessible outside a housing 520 of the multi-mode integral generator. A housing can be a container, a protective exterior (e.g., shell) or an enclosing structural element (e.g., chassis or exoskeleton) designed to enable easier handling, provide attachment points for internal mechanisms (e.g., mounting brackets for electrical components, cables and plumbing), maintain cleanliness of the contents by shielding dirt/dust, fouling and other contaminations, or protect interior mechanisms from structural stress and/or potential physical, thermal, chemical, biological or radiational damages from the surrounding environment. The housing can be used to keep contamination out of the machine, especially in the air gap between the rotor and stator.

The housing 520 can include a plurality of windings to generate electrical power. The multi-mode transmission integral generator 500 can be configured such that one end for each phase can be accessible outside the housing 520. For example, end-A 502 for Phase A, end-B 504 for Phase B, and end-C 506 of Phase C can be accessible outside the housing 520. End-A 502, end-B 504, and end-C 506 can correspond to end-A 428, end-B 430, and end-C 432 as illustrated in FIG. 4B.

FIG. 5 also illustrates that an opposite end of the multi-mode transmission integral generator 500 can be accessible outside the housing 520. For example, end-A* 508 for Phase A*, end-B* 510 for Phase B*, and end-C* 512 for Phase C* can be accessible outside the housing 520. End-A* 508, end-B* 510, and end-C* 512 can correspond to end-A* 434, end-B* 436, and end-C* 438 as illustrated in FIG. 4B. Also illustrated are a cooling input line 514 or a cooling output line 516. FIG. 5 illustrates one potential embodiment to provide access to the generator windings for implementing the techniques described herein.

By making both ends of the multi-mode transmission integral generator 500 accessible it is possible to use the windings for two different modes. In a first mode, as illustrated in FIG. 4B, one end of the windings can be connected to an external alternating current power source (through the appropriate partial line interface and isolation transformer) and the other end can be connected to a machine controller or GCBR. In a second mode, as illustrated in FIG. 4C one end of the windings can be connected together, and the second end can be connected to a machine controller or GCBR. Having both ends of the windings accessible outside the housing 520 provides for selection of the first mode or the second mode.

Laboratory tests on a modified transmission integral generator 500 have demonstrated the ability to generate direct current from an alternating current source using the generator windings to support active rectification. The generator performs the functions similar to the import LIU 108 as shown in FIG. 1.

In various embodiments, no rotor lock is required and passing the alternating current through the generator windings does not cause the generator to spin. The lack of need for a rotor lock is due to the fact that the generator is a synchronous machine. Such a machine will not start when three-phase AC is applied to the windings unless provisions are made to spin the shaft up to nearly synchronous speed, or if the rotor structure is built to include "damping bars" to allow for "induction start". The TIG 104 does not include damper bars.

The TIG 104 is not an induction machine with a squirrel-cage rotor. An induction machine would tend to rotate if the rotor was not locked- and if the rotor was locked, the induction machine would have excessive rotor losses. An exception could be a wound-rotor induction machine, which would allow the rotor windings to be open-circuited, preventing the tendency to rotate. The stator windings could then be used for power conditioning.

Figure 6:
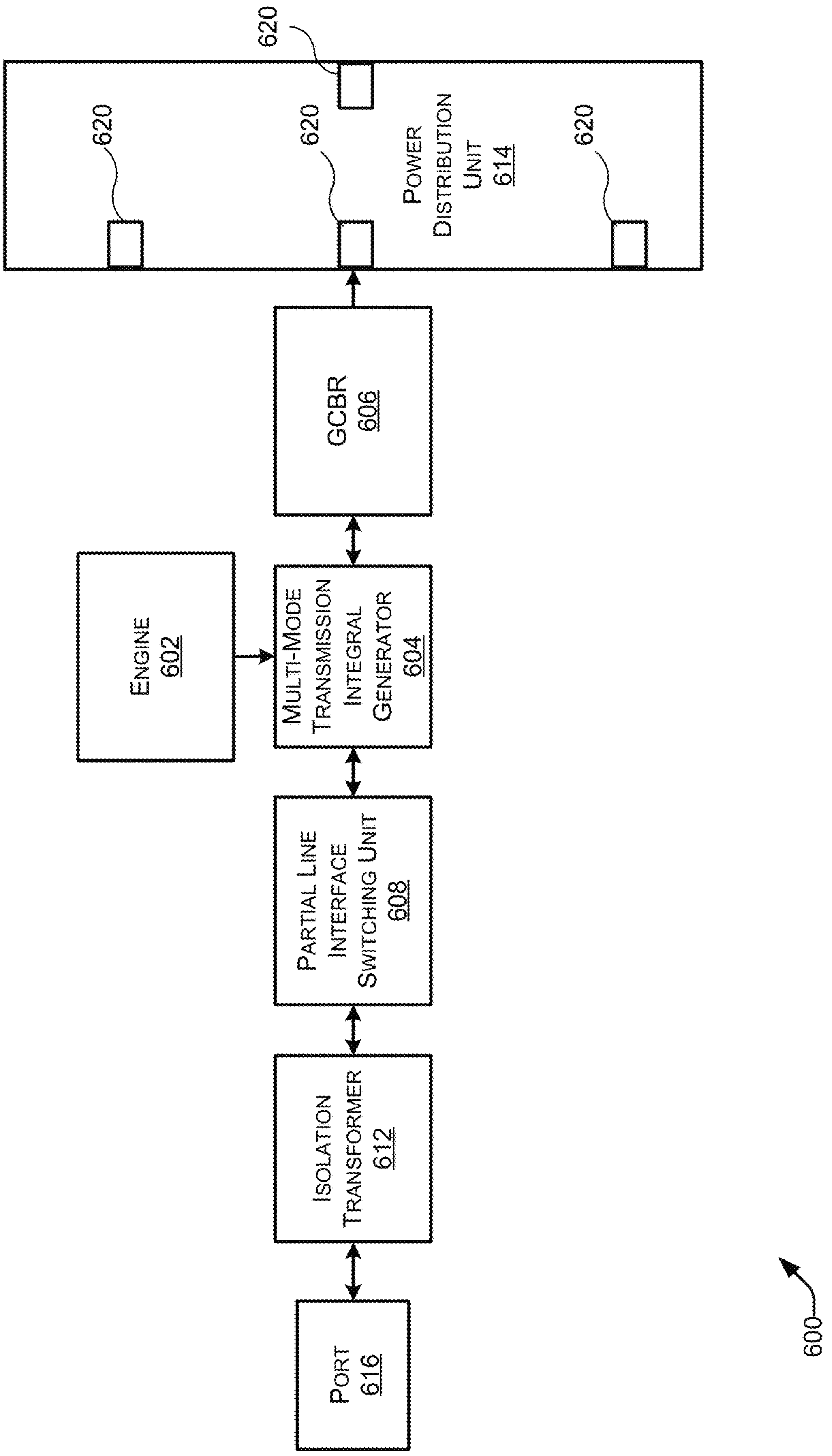
FIG. 6 illustrates a multi-mode transmission integral generator system according to an embodiment of the present disclosure during generation of electrical power.

FIG. 6 illustrates a multi-mode transmission integral generator system 600 according to an embodiment of the disclosure during generation of electrical power by a multi-mode TIG 604. The multi-mode transmission integral generator system 600 is a system to generate and control electrical power. FIG. 6 illustrates the flow of electrical power from the multi-mode TIG 604 to the PDU 614 via the GCBR 606. Although the multi-mode TIG 604 connects to the partial line interface switching unit 608 for the purpose of winding configuration, no power flows to the Port 616 via the partial line interface switching unit 608 and the isolation transformer 612 during electrical power generation. The multi-mode transmission integral generator system 600 can eliminate the redundant AC electrical power line interface units (LIUs) illustrated in FIG. 1. Similar to the transmission integral generator system 100 illustrated in FIG. 1, the multi-mode transmission integral generator system 600 can include an engine 602 to rotate a shaft for turning the multi-mode TIG 604 and a PDU 614 to distribute the electrical power. The engine 602 can connect via a rotating shaft with a multi-mode TIG 604.

During generation, mechanical power from the engine 602 flows to the multi-mode TIG 604. AC electrical power flows from the multi-mode TIG 604 to the GCBR 606, and DC power flows from the GCBR 606 to the PDU 614. No power flows from the multi-mode TIG 604 through the partial line interface switching unit 608 to the Port 618. The line interface switching unit configures the generator windings for generation (with a common node, or "wye" connection, or alternately with a delta connection).

The multi-mode TIG 604 can have each end of the phase winding accessible outside the generator casing as described above with respect to FIG. 5. The multi-mode TIG 604 can generate AC electrical current. In various embodiments, the AC electrical current can include multiple phases (e.g., 3-phases). In various embodiments, the AC electrical current can be variable voltage and variable frequency.

In various embodiments, the TIG 104 may not be intended to provide "raw" AC to a load. The TIG 104 can be constructed in such a way as to provide a non-standard frequency when producing, say, 208 $V_{rms}$ line-to-line; and when rotated at a speed to produce, e.g., 60 Hz, the voltage is non-standard. The TIG 104 is operated with a machine controller (GCBR) to provide power for active rectification.

It would be possible (in principle) to have a TIG constructed to provide, for example, 208 V and 60 Hz, but even then one would not attempt to use the machine for active rectification and to drive another load at the same time. In various embodiments, it would be possible to use the raw TIG output to drive an induction motor to run an alternator or pump.

The partial line interface switching unit 608 can include a plurality of contactors. The contactors allow for the configuration of the generator windings to provide a common point (or "wye" connection) when the multi-mode TIG 604 is rotating and generating power, and for the configuration of the generator windings to remove the common point and separate the windings when external AC power is connected for import (or export). As the windings of the multi-mode TIG 604 can generate heat, the multi-mode TIG 604 can be liquid-cooled. In various embodiments, other cooling methods, e.g., a heat sink or air cooling, can be used. Fluid cooling may be preferred in these systems because of the ability to remove kilowatts of heat loss while remaining sealed against the environment. Air cooling introduces ducting and fans that will not operate if submerged during a fording activity.

Figure 7:
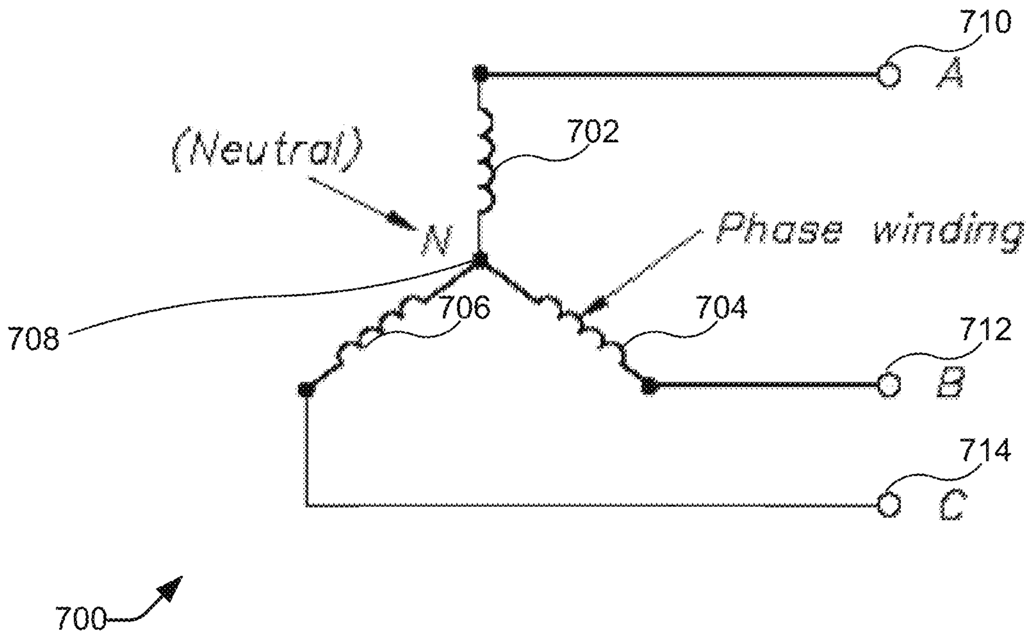
FIG. 7 illustrates a wye configuration for connecting the various windings of the multi-mode TIG.

FIG. 7 illustrates a wye configuration 700 for connecting the various windings of the multi-mode TIG 604. The wye configuration can allow for the three windings (e.g., Phase A winding 702, Phase B winding 704, and Phase C winding 706) to be connected at a neutral point 708. End-A 710, end-B 712, and end-C 714 can be connected to the GCBR 606 and the partial line interface switching unit 608 as shown in FIG. 6.

Alternate wiring configurations are possible for connecting the various windings of the multi-mode TIG 604. For example, a Delta configuration can connect the 3 phases like in a triangle. The Delta configuration may not include a neutral cable. In Delta configuration, the phase voltage can be equal to the line voltage.

Returning to FIG. 6, The generator controller bus regulator (GCBR) 606 can perform the functions of the GCBR 106 as described in relation to FIG. 1 in addition to the functions of the import machine controller 110 or the export machine controller 111 depending on the particular state of operation as described for FIG. 1. In various embodiments, the GCBR 606 can be the only machine controller utilized, thereby reducing the weight and space in comparison with other designs. GCBR 606 can include insulated-gate bipolar transistors (IGBTs), one or more capacitors, and appropriate control electronics. The GCBR 606 can actively rectify the AC electrical power generated by the multi-mode TIG 604 and generate a predetermined DC voltage that is sent to the PDU 614.

The PDU 614 can include a set of DC switches configured to distribute power to loads or input power from other sources. In some embodiments, the PDU 614 can provide MicroGrid-ready 600 volts DC.

In various embodiments, the external AC electrical power source can be a predetermined frequency. In some embodiments, the predetermined frequency can be 60 Hz. In various embodiments, the external AC electrical power source can be a predetermined voltage. In some embodiments, the predetermined voltage can be 208 volts AC. In various embodiments, the predetermined voltage can be 480 volts AC. Isolation transformer 612 can be configured to handle a variety of such predetermined voltages by means of winding taps.

An advantage of the multi-mode transmission integral generator system 600 can be to make more PDU ports available for use (e.g., micro grid, inverters, DC-DC converters, etc.). The PDU 614 can include a plurality of Ports 620. The Ports 620 allow for connection of various components to the PDU 614. While FIG. 1 illustrates four ports, one skilled in the art would appreciate any number of Ports 620 being used. As illustrated in FIG. 6, the GCBR 606 connects to the PDU 614 via one of the Ports 620. In contrast with FIG. 1, the multi-mode transmission integral generator system 600 does not include the import machine controller 110 or the export machine controller 111 as illustrated in FIG. 1. By reducing the number of components that connect to the PDU 614, the multi-mode transmission integral generator system 600 makes more ports available for connecting other electrical components. For example, between FIG. 1 and FIG. 6, two additional Ports 620 are available.

As illustrated in FIG. 6, the import LIU 108 and the export LIU 109 illustrated in FIG. 1 can be replaced by a single, partial line interface switching unit 608. The switching portion allows for the configuration of the generator windings to provide a common point (or "wye" connection) when the multi-mode TIG 604 is rotating and generating power, and for the configuration of the generator windings to remove the common point and separate the windings when external AC power is connected for import (or export). Switching can also be accomplished by connectors, bus bars, electromechanical switches, or manual switches. The partial line interface switching unit can includes a portion of the LC network that is in a conventional line interface, with the machine controller-side reactor replaced with the TIG windings, plus the switching needed to select power import/export or generation. The partial line interface switching unit can also include an LC network to provide the filtering necessary to prevent high-frequency switching currents from entering the AC service.

The multi-mode transmission integral generator system 600 can also include a single isolation transformer 612 that performs the same functions of the import isolation transformer 112 and the export isolation transformer 113 illustrated in FIG. 1.

Figure 8:
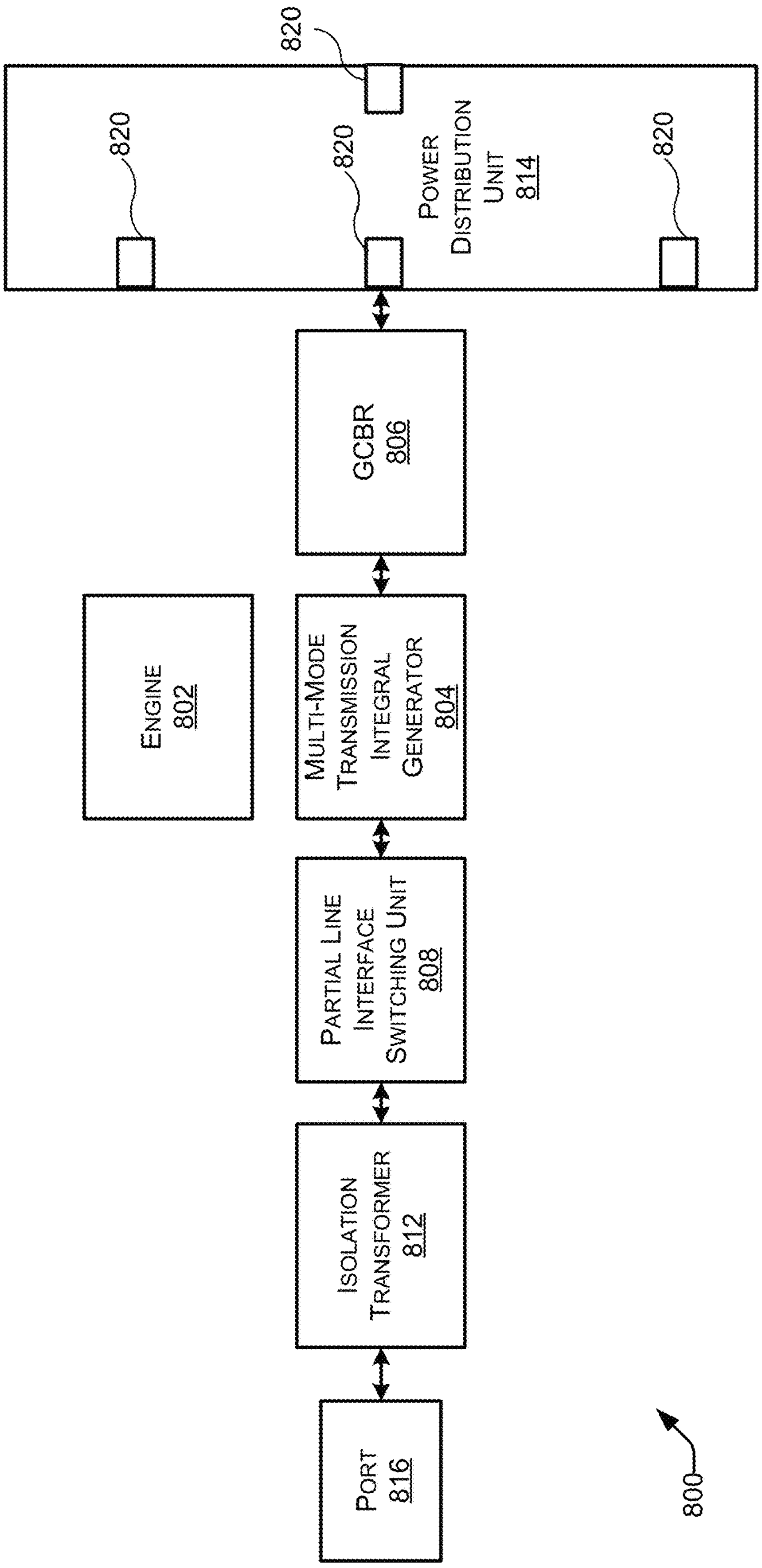
FIG. 8 illustrates a dual-mode transmission integral generator system according to an embodiment of the present disclosure during conditioning of external electrical power for import, or conditioning electrical power for export.

FIG. 8 illustrates a multi-mode transmission integral generator system 800 according to an embodiment of the disclosure during the import or export of electrical power via Port 816. In this embodiment, the multi-mode TIG 804 is not generating electrical power. FIG. 8 illustrates the bidirectional flow of electrical power from the Port 816 through the isolation transformer 812, partial line interface switching unit 808 through the windings of the multi-mode TIG 804 through the generator control bus regulator (GCBR) 806 to the PDU 814. The multi-mode transmission integral generator system 800 can eliminate the redundant AC electrical power line interface units (LIUs) illustrated in FIG. 1. Similar to the transmission integral generator system 100 illustrated in FIG. 1, the multi-mode transmission integral generator system 800 can include an engine 802 to rotate a shaft for turning the multi-mode TIG 804. During reception of electrical power from Port 816, that is, during power import, the engine 802 will not be running. The same is true during power export.

During AC power import, the engine 802 is not running and provides no power to the multi-mode TIG 804. AC electrical power flows from the Port 816, through the isolation transformer 812, through the partial line interface switching unit 808, and through the multi-mode TIG 804 windings to the GCBR 806. The GCBR 806 performs active rectification and DC power flows from the GCBR 806 to the PDU 814. The partial line interface switching unit 808 configures the multi-mode TIG 804 windings for separate flow-through use.

During AC power export, the engine 802 is not running and provides no power to the multi-mode TIG 804. The PDU 814 accepts DC power through one or more Ports 820 and this flows to the GCBR 806, which is used as an inverter to convert the DC power to AC. The multi-mode TIG 804 windings form the first impedances of an LC filter, the remainder of which resides within the partial line interface switching unit 808 (hence the term "partial"). Filtered AC power then flows from the partial line interface switching unit 808, through the isolation transformer 812, and to the Port 816. The partial line interface switching unit 808 configures the multi-mode TIG 804 windings for separate flow-through use.

The multi-mode TIG 804 can have both ends of each phase winding accessible outside the generator casing as described above with respect to FIG. 5. The multi-mode TIG 804 can condition the received AC electrical current from an external source via the Port 816, or condition AC electrical current to be exported to an external load via the Port 816. In various embodiments, the AC electrical current can include multiple phases (e.g., 3-phases). In various embodiments, the AC electrical current can be variable voltage and variable frequency.

Figure 9:
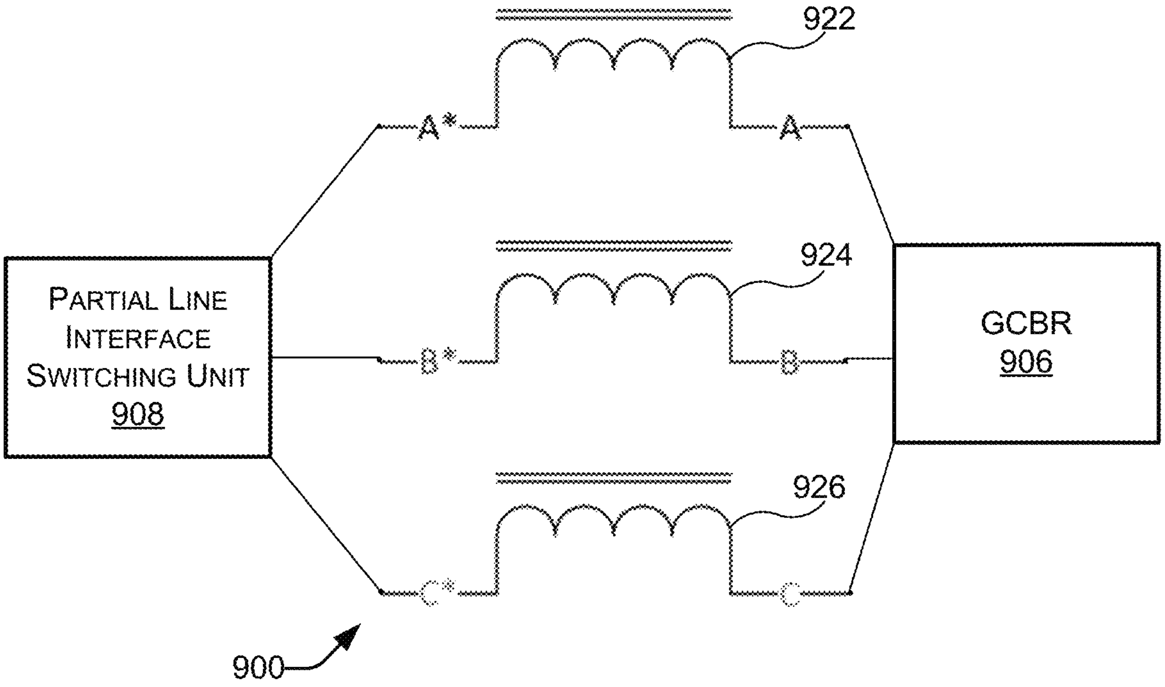
FIG. 9 illustrates a second configuration in which the wiring for the windings is kept separate.

FIG. 9 illustrates a second configuration 900 in which the wiring for the windings is kept separate. This is different from the wye configuration as illustrated in FIG. 7. In various embodiments the multi-mode TIG 804, as shown in FIG. 8, can include various windings (e.g., Phase A windings 922, Phase B windings 924, and Phase C windings 926). The second configuration 900 can connect one end of the windings (e.g., Phase A*, Phase B*, and Phase C*) to the partial line interface switching unit 908 and the other end (e.g., Phase A, Phase B, and Phase C) to the GCBR 906. The impedance inherent in the various windings (e.g., Phase A windings 922, Phase B windings 924, and Phase C windings 926) can support active rectification of the electrical current. A GCBR 906 or machine controller can provide or perform active rectification.

Returning to FIG. 8, the GCBR 806 can perform the functions of the GCBR 106 as described in relation to FIG. 1 in addition to the functions of the import machine controller 110 or the export machine controller 111 depending on the particular state of operation as described for FIG. 1.

In various embodiments, the GCBR 806 can be the only machine controller utilized, thereby reducing the weight and space in comparison with other designs. The GCBR 806 can include an insulated-gate bipolar transistors (IGBTs), one or more capacitors, and appropriate control electronics. The GCBR 806 can actively rectify the AC electrical power received from the external power source via the Port 816 and generate a predetermined DC voltage that is sent to the PDU 814.

The PDU 814 can include a set of DC switches configured to distribute power or input power from other sources or loads. In some embodiments, the PDU 814 can provide MicroGrid-ready 600 volts DC. In various embodiments, the external AC electrical power source can be a predetermined frequency. In some embodiments, the predetermined frequency can be 60 Hz. In various embodiments, the external AC electrical power source can be a predetermined voltage. In some embodiments, the predetermined voltage can be 208 volts AC. In various embodiments, the predetermined voltage can be 480 volts AC. Isolation transformer 812 can be configured for a variety of such predetermined voltages by means of winding taps.

An advantage of the multi-mode transmission integral generator system 800 can be to make more PDU ports available for use (e.g., MicroGrid, inverters, DC-DC converters, etc.). The PDU 814 can include a plurality of Ports 820. The Ports 820 allow for connection of various components to the PDU 814. While FIG. 1 illustrates four ports, one skilled in the art would appreciate any number of Ports 820 being used. As illustrated in FIG. 8, the GCBR 806 connects to the PDU 814 via one of the Ports 820. In contrast with FIG. 1, the multi-mode transmission integral generator system 800 does not include the import machine controller 110 or and the export machine controller 111 as illustrated in FIG. 1. By reducing the number of components that connect to the PDU 814, the multi-mode transmission integral generator system 800 makes more ports available for connecting other electrical components. For example, between FIG. 1 and FIG. 8, two additional Ports 820 are available.

As illustrated in FIG. 8, the import LIU 108 and the export LIU 109 illustrated in FIG. 1 can be replaced by a single, partial line interface switching unit 808. The partial line interface switching unit 808 can be configured to disconnect from the external AC electrical power line when the multi-mode TIG 804 is rotating in order to produce electrical power. The switching portion allows for the configuration of the generator windings to provide a common point (or "wye" connection) when the multi-mode TIG 604 is rotating and generating power, and for the configuration of the generator windings to remove the common point and separate the windings when external AC power is connected for import (or export). Switching can also be accomplished by connectors, bus bars, electromechanical switches, or manual switches.

The multi-mode transmission integral generator system 800 can also include an isolation transformer 812 that performs the same functions of the import isolation transformer 112 and the export isolation transformer 113 illustrated in FIG. 1.

Figure 10:
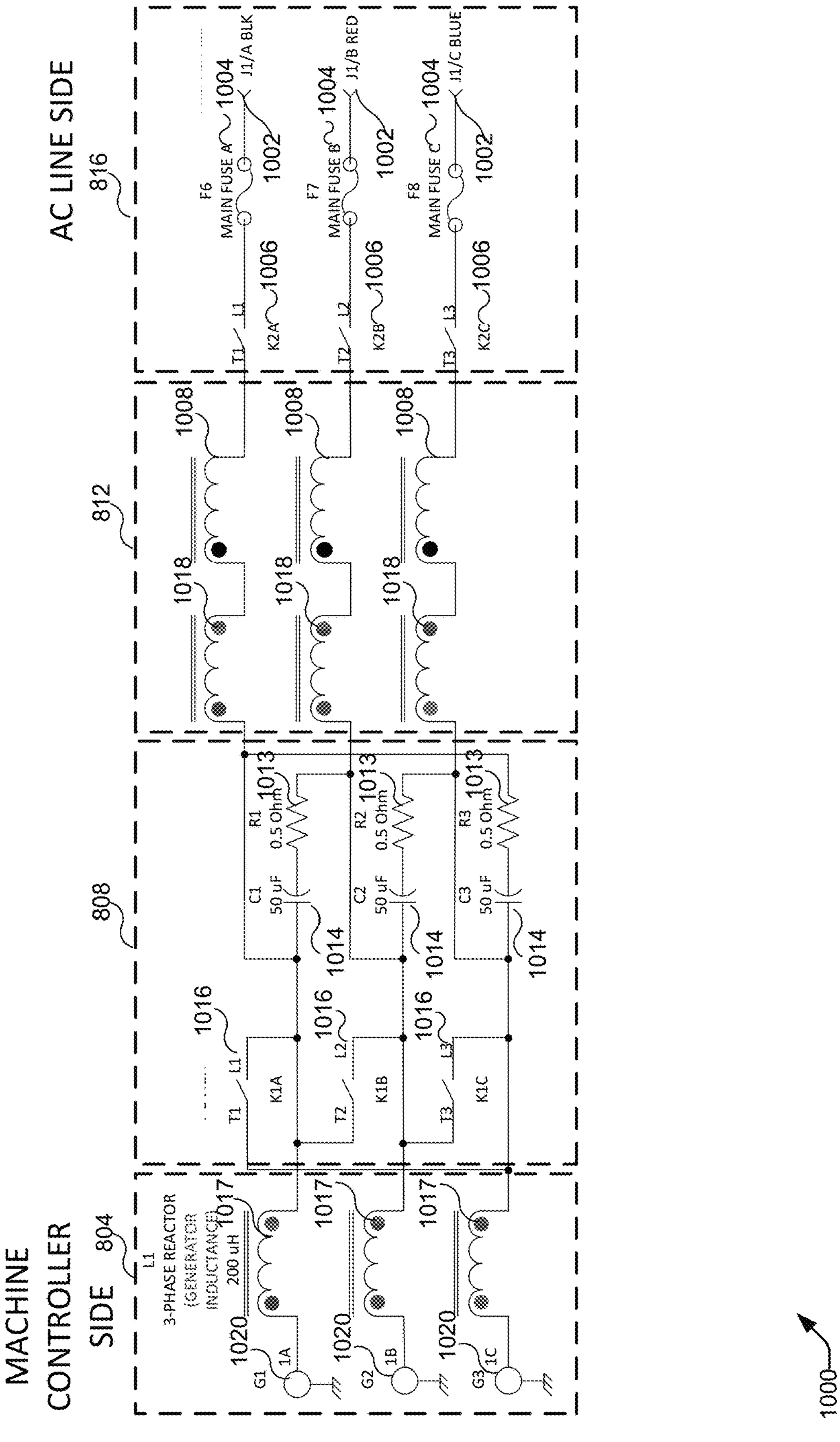
FIG. 10 illustrates a first simplified transmission integral generator/line interface schematic according to an embodiment of the present disclosure.

FIG. 10 illustrates a first simplified transmission integral generator/line interface schematic 1000 according to an embodiment of the present disclosure. A multi-mode transmission integral generator system 1000 can include an AC Line Side and a Machine Controller Side. Starting from the AC Line Side, in Port 816, shown in FIG. 8, the AC external power source can be connected to the multi-mode transmission integral generator system 1000 via a series of connectors 1002. For example, the connectors 1002 can be class "L" circular connectors. In various embodiments, the connectors 1002 can allow the connection of each of three phases of AC electrical power. In various embodiments, fuses 1004 can allow for equipment protection and for the disconnection of the AC electrical power from the multi-mode transmission integral generator system 1000. Electrical switches 1006 can allow for selective connection of the AC electrical power provided by either the external source or the multi-mode transmission integral generator 804. For example, in various embodiments, electro-mechanical switches can be used. The electro-mechanical switches can be energized for import of AC electrical power from an external power source (or for export of AC power to an external load) as in FIG. 8 and turned off for power generation as shown in FIG. 6.

The Port 816 can be connected to the isolation transformer 812. The isolation transformer 812 can be connected to the partial line interface switching unit 808 which can include various components (e.g., a common mode choke 1008 and a differential mode reactor 1018). In various embodiments, the electrical switches 1006 can be connected to a common mode choke 1008. The common mode choke 1008 can include one or more inductors providing a predetermined impedance. A common mode choke blocks high frequency noise and switching artifacts common to multiple conductors while allowing a desired low-frequency waveform to pass.

In various embodiments, the common mode choke 1008 can be connected with a three-phase differential mode reactor 1018. The three-phase differential mode reactor 1018, along with capacitors 1014, resistors 1013, and TIG impedances 1017, form a damped low-pass filter used to suppress differential mode noise and switching artifacts and greatly reduce the injection of such noise and artifacts into the AC service.

The isolation transformer 812 can be connected to the partial line interface switching unit 808 as shown in FIG. 8. The partial line interface switching unit 808 can include one or more resistors 1013, one or more capacitors 1014, and one or more switches 1016 or contactors. The capacitors 1014 and resistors 1013 can be connected in series. The capacitors 1014 and resistors 1013 can form a damping network as part of an LC low-pass filter. The damping network can include a capacitor and resistor connected to each phase of the multi-mode transmission integral generator 804. The switches 1016 can be closed for electrical power generation and open for AC electrical power import/export.

The partial line interface switching unit 808 can be connected to the multi-mode transmission integral generator 804. In various embodiments, switches 1016 can be connected to the TIG impedances 1017. For example, in various embodiments, electro-mechanical switches can be used. The electro-mechanical switches can be configured for import of AC electrical power from an external power source (or export of AC electrical power to an external load) or configured for power generation in which power from the multi-mode transmission generator 604 can flow to a GCBR 606 and PDU 614 as shown in FIG. 6. The TIG impedances 1017 can be connected to the gland and lug machine controller connectors 1020. Various connection methods could be used.

Figure 11:
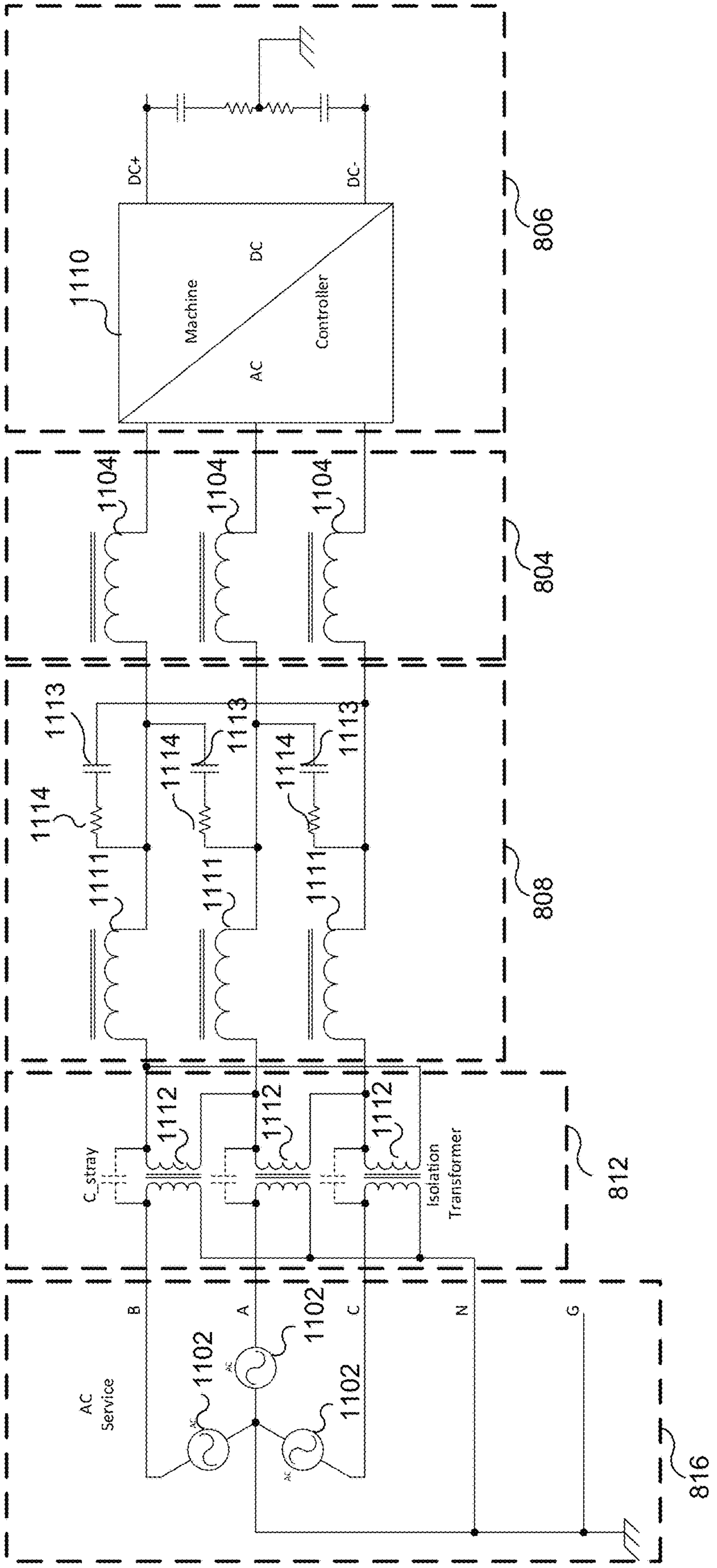
FIG. 11 illustrates a second simplified integral transmission integral generator/line interface schematic according to an embodiment of the present disclosure.

FIG. 11 illustrates a second simplified multi-mode integral transmission integral generator/line interface schematic 1100 according to an embodiment of the present disclosure. The second simplified multi-mode integral transmission integral generator/line interface schematic 1100 illustrates additional details of various components such as the Port 816, the isolation transformer 812, the partial line interface and switching unit 808, the multi-mode transmission integral generator 804, and the GCBR 806 as shown in FIG. 8.

The Port 816 can include AC electrical power connectors 1102. Various electrical lines can connect to connectors 1102 to the isolation transformer 1112. The connectors 1102 can allow for connection/disconnection of the AC electrical power source at Port 816. As illustrated in FIG. 11, each phase of the AC service can be connected to an isolation transformer 1112.

The isolation transformer 1112 can be connected to a partial line interface switching unit 808 as illustrated in FIG. 8. The partial line interface switching unit 808 can include one or more reactors 1111. The reactors 1111 can include differential and common-mode reactors. The partial line interface switching unit 808 can include one or more resistors 1114, and one or more capacitors 1113. The partial line interface switching unit 808 can be connected to the multi-mode TIG 804 as shown in FIG. 8. The multi-mode TIG 804 can include a plurality of windings 1104 of the TIG 804 which can be used to generate AC electrical power when the multi-mode TIG 804 is operating as a generator or as a differential-mode inverter-side reactor when the multi-mode TIG 804 is not operating, and AC electrical power is being imported or exported by the Port 816. The TIG windings 1104 can be connected to a machine controller 1110. The machine controller 1110 can convert the imported AC electrical power to direct current for distribution or can convert direct current to AC electrical power for export.

Figure 12:
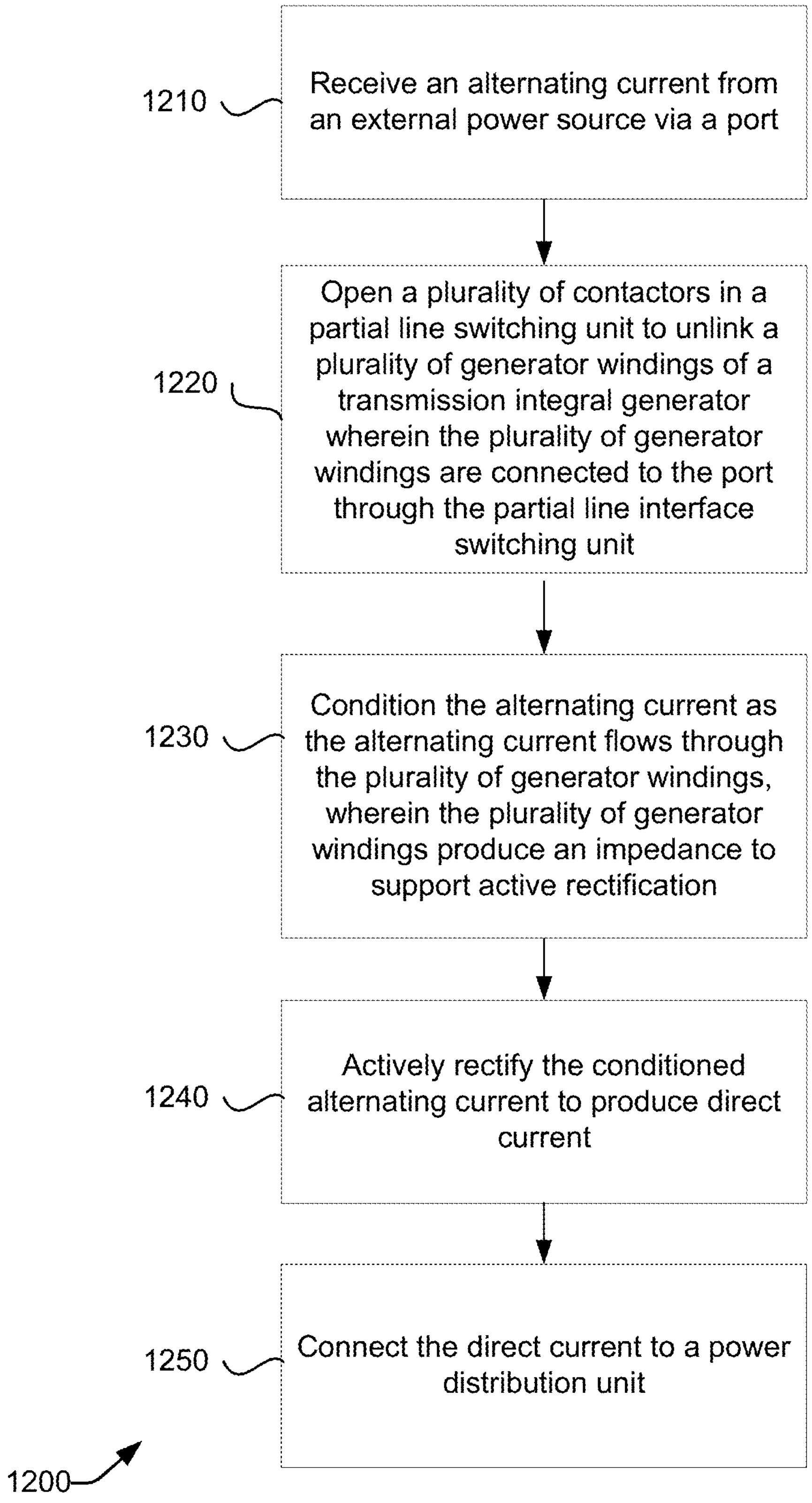
FIG. 12 is a first exemplary flow for conditioning electrical current using the windings of a transmission integral generator according to an embodiment of the present disclosure.

FIG. 12 is a flowchart of a process 1200 associated with transmission integral generator/line interface unit magnetics integration according to an embodiment of the present disclosure. In some implementations, one or more process blocks of FIG. 12 may be performed by a transmission integral generator system (e.g., multi-mode transmission integral generator system 800). In some implementations, one or more process blocks of FIG. 12 may be performed by another device or a group of devices separate from or including the transmission integral generator system. Additionally, or alternatively, one or more process blocks of FIG. 12 may be performed by one or more components of the multi-mode transmission integral generator system 800, such as an engine 802, a multi-mode TIG 804, a GCBR 806, a partial line interface switching unit 808, an isolation transformer 812, a Port 816, and a PDU 814.

The process 1200 can include receiving an alternating current from an external power source via a port (1210). For example, the transmission integral generator system may receive an alternating current from an external power source via a Port 816, as described above. The multi-mode transmission integral generator system 800 can be incorporated into a vehicle (e.g., a high mobility multipurpose wheeled vehicle or Humvee). The multi-mode transmission integral generator system 1000 can receive external electrical power from an electrical power source other than the multi-mode TIG 804. For example, a line from an external power source (e.g., an electrical power line) can be connected to the Port 816. For example, in the multi-mode transmission integral generator system 1000, the external power source can provide AC electrical power. The AC electrical power can have a predetermined frequency (e.g., a 60 Hz) and a predetermined voltage (e.g., 208 volts AC). Typically, the external power would come from a local service which would include a step-down transformer to reduce the voltage from the overhead lines. The external power source can include overhead line power (e.g., received via transmission lines from an electrical power plant) or be from an external generator source (a local generator).

The process 1200 can include opening a plurality of contactors in a partial line interface switching unit to unlink a plurality of generator windings of a transmission integral generator wherein the plurality of generator windings are connected to the port through the partial line interface switching unit (1220). For example, the multi-mode transmission integral generator system 1000 may open a plurality of switches 1016 in a partial line switching unit to unlink a plurality of TIG impedances 1017 of a multi-mode transmission integral generator 804 wherein the plurality of TIG impedances 1017 as shown in FIG. 10 are connected to the Port 816, as described above. In various embodiments, the plurality of contactors can be opened using a plurality of electro-mechanical switches. A control voltage can be applied and/or removed from the electro-mechanical switches to control the electro-mechanical switches.

The process 1200 can include conditioning the alternating current as the current flows through the plurality of generator windings, wherein the plurality of generator windings produce an impedance to support active rectification (1230). For example, the multi-mode transmission integral generator system 1000 may condition the alternating current as the current flows through the plurality of TIG impedances 1017 as shown in FIG. 10, wherein the plurality of generator windings produce an impedance, as described above.

The process 1200 may include actively rectifying the conditioned alternating current to produce direct current (1240). The GCBR 806 can actively rectify the alternating current received from the windings of the multi-mode TIG 804. The GCBR 806 can provide direct current to the PDU 814.

The process 1200 may include connecting the direct current to a power distribution unit (1250). For example, the multi-mode transmission integral generator system 800 may connect the direct current from GCBR 806 to a power distribution unit (e.g., PDU 814) as shown in FIG. 8.

Process 1200 may include additional implementations, such as any single implementation or any combination of implementations described below and/or in connection with one or more other processes described elsewhere herein.

In a first implementation, process 1200 includes damping connected to each phase line of the transmission integral generator, using a capacitor 1014 and a resistor 1013 in series as shown in FIG. 10 with each line.

In a second implementation, process 1200 includes passing the alternating current through an isolation transformer 812 between the Port 816 and the partial line interface switching unit 808 as shown in FIG. 10.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel. Other sequences of steps can also be performed according to alternative embodiments. For example, alternative embodiments of the present disclosure can perform the steps outlined above in a different order. Moreover, the individual steps illustrated in FIG. 12 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 13:
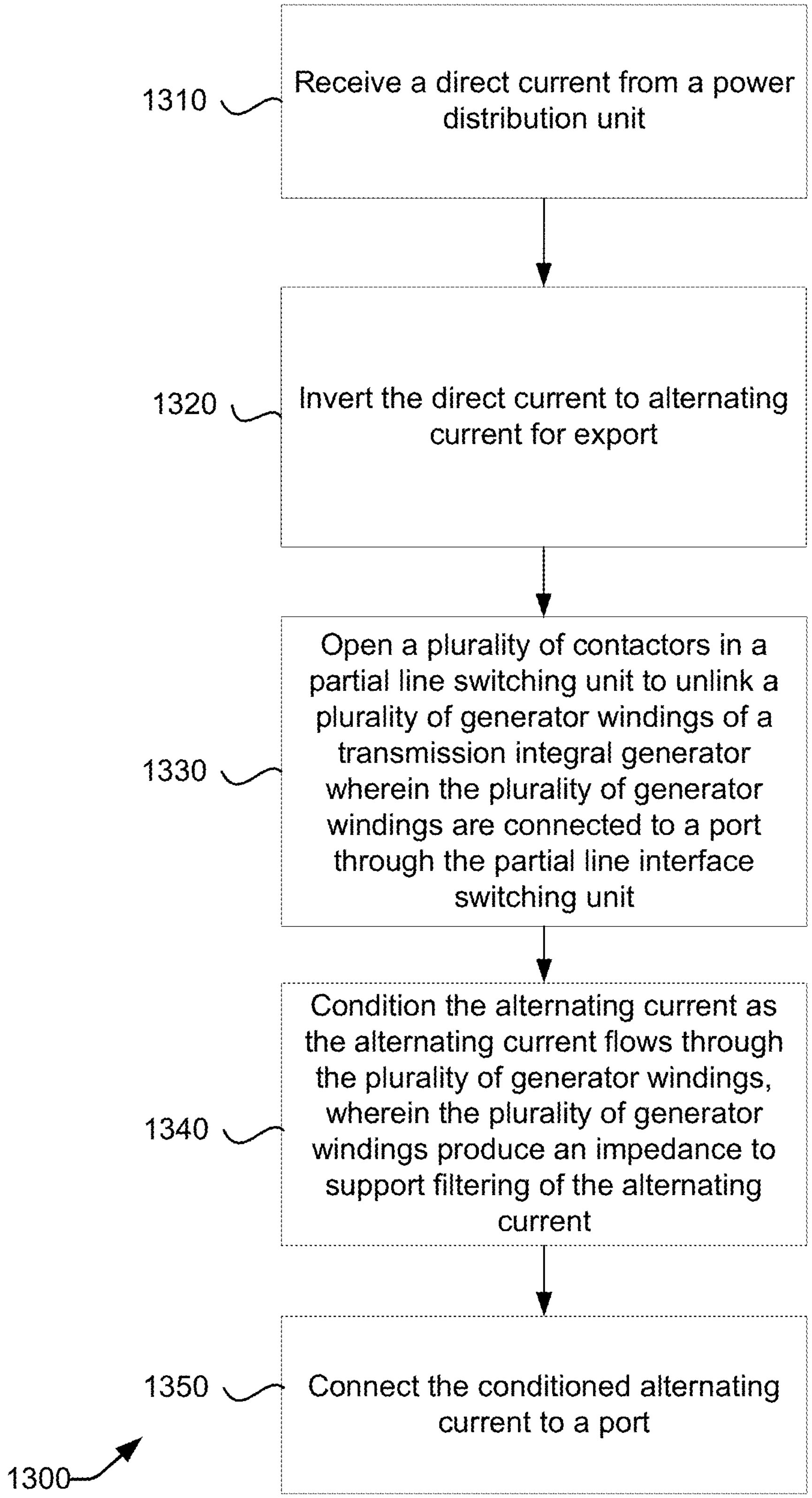
FIG. 13 is a second exemplary flow for conditioning electrical current using the windings of a transmission integral generator according to an embodiment of the present disclosure.

FIG. 13 is a flowchart of a process 1300 associated with transmission integral generator/line interface unit magnetics integration according to an embodiment of the present disclosure. In some implementations, one or more process blocks of FIG. 13 may be performed by a transmission integral generator system (e.g., multi-mode transmission integral generator system 800). In some implementations, one or more process blocks of FIG. 13 may be performed by another device or a group of devices separate from or including the transmission integral generator system 800. Additionally, or alternatively, one or more process blocks of FIG. 13 may be performed by one or more components of the multi-mode transmission integral generator system 800, such as an engine 802, a multi-mode TIG 804, a GCBR 806, a partial line interface switching unit 808, an isolation transformer 812, a Port 816, and a PDU 814.

The process 1300 can include receiving a direct current from an external power source via a power distribution unit (1310). For example, the transmission integral generator system may receive a direct current from a power distribution unit, as described above. The multi-mode transmission integral generator system 800 can be incorporated into a vehicle (e.g., a high mobility multipurpose wheeled vehicle or Humvee). The multi-mode transmission integral generator system 1000 can receive external electrical power from an electrical power source other than the multi-mode TIG 804. For example, a direct current power source can be connected to the PDU 814. The PDU could receive direct current power from a variety of compatible sources, including other similarly-equipped vehicles forming a "Micro-Grid."

The process 1300 can include inverting the direct current to alternating current (1320). The inversion can be performed by a GCBR 806 or a machine controller.

The process 1300 can include opening a plurality of contactors in a partial line interface switching unit to unlink a plurality of generator windings of a transmission integral generator wherein the plurality of generator windings are connected to a Port through a partial line interface switching unit (1330). For example, the multi-mode transmission integral generator system 1000 may open a plurality of switches 1016 in a partial line switching unit to unlink a plurality of TIG impedances 1017 of a multi-mode transmission integral generator 804 wherein the plurality of TIG impedances 1017 as shown in FIG. 10 are connected to the Port 816, as described above. In various embodiments, the plurality of contactors can be opened using a plurality of electro-mechanical switches. A control voltage can be applied and/or removed from the electro-mechanical switches to control the electro-mechanical switches.

The process 1300 can include conditioning the alternating current as the current flows through the plurality of generator windings, wherein the plurality of generator windings produce an impedance to support filtering of the alternating current (1340). For example, the multi-mode transmission integral generator system 1000 may condition the alternating current as the current flows through the plurality of TIG impedances 1017 as shown in FIG. 10, wherein the plurality of generator windings produce an impedance, as described above.

The process 1300 may include connecting the conditioned alternating current to an external load (1350). The external load can be connected to the port. For example, the multi-mode transmission integral generator system 1000 may connect the conditioned alternating current to the Port 816, as described above.

Process 1300 may include additional implementations, such as any single implementation or any combination of implementations described below and/or in connection with one or more other processes described elsewhere herein.

In a first implementation, process 1300 includes damping connected to each phase line of the transmission integral generator, using a capacitor 1014 and a resistor 1013 in series as shown in FIG. 10 with each line.

In a second implementation, process 1300 includes passing the alternating current through an isolation transformer 812 between the partial line interface switching unit 808 and the Port 816 and as shown in FIG. 10.

In a third implementation, process 1300 includes switching the plurality of switches 1016 in the partial line interface switching unit 808 to link the plurality of TIG impedances 1017 of a multi-mode transmission integral generator 804 when power generation by the multi-mode transmission integral generator 804 is desired.

In a fourth implementation, the plurality of generator windings 702, 704, 706 of the multi-mode transmission integral generator 804 are connected in a wye configuration as shown in FIG. 7.

In a fifth implementation, process 1300 includes rectifying the generated current using a GCBR 806 coupled to the multi-mode transmission integral generator 804.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel. Other sequences of steps can also be performed according to alternative embodiments. For example, alternative embodiments of the present disclosure can perform the steps outlined above in a different order. Moreover, the individual steps illustrated in FIG. 13 can include multiple sub-steps that can be performed in various sequences as appropriate to the individual step. Furthermore, additional steps can be added or removed depending on the particular applications. One of ordinary skill in the art would recognize many variations, modifications, and alternatives.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, processors can reside inside the GCBR or machine controller. A processor may control the switching of the TIG winding configuration between import/export and electrical power generation.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A method of converting alternating current to direct current, the method comprising:

receiving an alternating current from an external power source via a port;

providing a partial line interface switching unit including a plurality of contactors;

opening the plurality of contactors in the partial line interface switching unit to unlink a plurality of generator windings of a transmission integral generator while a rotor of the transmission integral generator is stationary, wherein the plurality of generator windings are connected to the port through the partial line interface switching unit;

forming a filter network including components of the partial line interface switching unit and the plurality of generator windings;

filtering the alternating current as the alternating current flows through the plurality of generator windings, wherein the plurality of generator windings produce an impedance;

applying the alternating current to the plurality of generator windings forming part of the filter network to provide inductance to support an active rectification process;

actively rectifying the filtered alternating current using a generator controller bus regulator coupled to the transmission integral generator while the rotor of the transmission integral generator is stationary to produce a direct current;

connecting the direct current to a power distribution unit; and outputting the direct current from the power distribution unit.

2. The method of claim 1, further comprising passing the alternating current through a damping network comprising a resistor and capacitor connected in series to each winding of the plurality of generator windings of the transmission integral generator.

3. The method of claim 2, further comprising passing the alternating current through one or more reactors connected between the damping network and the port.

4. The method of claim 3, wherein the one or more reactors comprise differential reactors.

5. The method of claim 3, wherein the one or more reactors comprise common-mode reactors.

6. The method of claim 1, further comprising passing the alternating current through an isolation transformer between the port and the partial line interface switching unit.

7. The method of claim 1, further comprising cooling the transmission integral generator using a liquid coolant.

8. The method of claim 1, further comprising closing the plurality of contactors in the partial line interface switching unit to link the plurality of generator windings of the transmission integral generator for generation of electrical power.

9. The method of claim 8, further comprising connecting the plurality of generator windings of the transmission integral generator in a wye configuration.

10. The method of claim 8, further comprising connecting the plurality of generator windings of the transmission integral generator in a delta configuration.

11. The method of claim 8, further comprising turning the rotor of a transmission integral generator using an engine.

12. The method of claim 8, further comprising distributing the electrical power using the power distribution unit.

13. The method of claim 1, wherein:

the transmission integral generator is enclosed by a housing;

the alternating current comprises multiple phases;

the transmission integral generator includes a winding for each phase of the multiple phases, wherein each winding includes a first end and a second end; and the first end and the second end of each winding are accessible outside the housing.

* * * * *